United States Patent [19]

Gath

[11] 4,329,668
[45] May 11, 1982

[54] LEAKAGE CURRENT CIRCUIT BREAKER RESPONSIVE TO DIRECT-CURRENT LEAKAGE CURRENTS OF BOTH POLARITIES

[76] Inventor: Nicolas Gath, 15, rue Jos. Tockert, Luxembourg-Hollerich, Luxembourg

[21] Appl. No.: 141,082

[22] PCT Filed: Aug. 28, 1978

[86] PCT No.: PCT/EP78/00013
§ 371 Date: Apr. 26, 1979
§ 102(e) Date: Apr. 26, 1979

[87] PCT Pub. No.: WO79/00127
PCT Pub. Date: Mar. 22, 1979

[30] Foreign Application Priority Data

Sep. 2, 1977 [LU] Luxembourg .................. 78075

[51] Int. Cl.³ ........................................ H01H 83/02
[52] U.S. Cl. ............................................ 335/18; 335/19
[58] Field of Search ............... 335/18, 19, 170, 174; 361/44, 45, 46; 336/214, 215, 212; 324/51, 133

[56] References Cited

U.S. PATENT DOCUMENTS

| | | | |
|---|---|---|---|
| 3,215,799 | 11/1965 | Clausing | 335/18 |
| 3,299,377 | 1/1967 | Circle et al. | 335/19 |
| 3,757,201 | 9/1973 | Cornwell | 336/212 |
| 4,021,729 | 5/1977 | Hudson, Jr. | 361/45 |

*Primary Examiner*—Harold Broome
*Attorney, Agent, or Firm*—Scully, Scott, Murphy & Presser

[57] ABSTRACT

A leakage current circuit breaker has operating current carrying conductors (5) which are interlinked with a core (6) the magnetic induction flux of which in the case of leakage cause the response of a triggering device. When a permanent magnetic field is superimposed by a magnetic field generated by the leakage current, the magnetic field in the magnetic system of the triggering device can be weakened to such an extent that the armature (8) will drop down. In particular, the core (6) can encompass the operating current-carrying conductors (5) in a plurality of windings and can be a component of the magnetic system (1) with the induction flux conductor (7) of the triggering device. The invention provides for the core (6) crossing the induction flux conductor (7) of the triggering device (FIG. 3).

8 Claims, 11 Drawing Figures

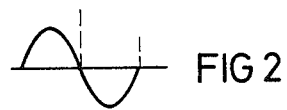
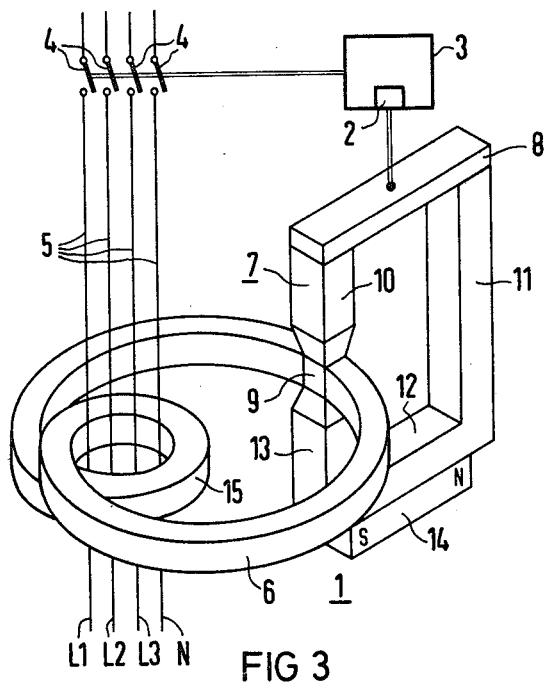

LEAKAGE CURRENT CIRCUIT BREAKER RESPONSIVE TO DIRECT-CURRENT LEAKAGE CURRENTS OF BOTH POLARITIES

The present invention relates to a leakage current circuit breaker constructed in accordance with the preamable of claim 1. In the hitherto usual leakage current circuit breakers, the leakage current is determined through the operating current-carrying conductors being wound as coils over the core of a totalizing current transformer. In the case of the flow of a leakage current which is constituted of an alternating current, an alternating current is generated in a secondary coil and is conducted through the coil of the magnetic system of a triggering device containing a permanent magnet. The thus generated through-flux reduces the induction flux which is generated by the permanent magnet and resultingly, the attractive force acting on the armature of the triggering device. The armature is released, it drops down, whereupon the leakage current circuit breaker switches off through the intermediary of a locking cam.

However, when a leakage current flows which is constituted of a direct current, then this is not transmitted by a transformer of the ususal type and the switching off is inhibited. At another source there has already been proposed a leakage current circuit breaker (Luxembourg Patent Application No. 78.012 of Aug. 22, 1977), whose operating current-carrying conductors are interlinked with a core whose magnetic induction flux effects the actuation of a triggering device in the case of failure or leakage, in which an armature of the triggering device will drop down, upon the superposition of a permanent magnet field with a magnetic field produced by the leakage current, from the magnetic system of the triggering device. The special feature of the already proposed leakage current circuit breaker can be ascertained in that the core itself encompasses the operating current-carrying conductors in a plurality of windings and that the core is a component of the magnetic system of the triggering device. Such a leakage current circuit breaker can respond to a direct current of a predetermined direction, since also a direct-current leakage current can generate a magnetic flux in the magnetic system of the triggering device.

Also known are leakage current circuit breakers which operate in accordance with the lock magnet principle and which are responsive to direct-current leakage currents of both directions. However, it is disadvantageous that for the usual constructional sizes there is not attained the generally desired high degree of sensitivity.

Accordingly, it is an object of the present invention to develop a leakage current circuit breaker of high sensitivity which can be responsive to smooth direct-current leakage currents of both polarities, and which is adequate with merely a triggering device.

The solution of the described object is effectuated in that the core crosses the induction flux conductor of the triggering device. In the case of a leakage current, irrespective as to whether it relates to a direct current or an alternating current, the magnetic resistance rises in the crossing zone so that the armature can drop down. Such a magnetic system facilitates one can operate with a single interlinking between the core and the operating current-carrying conductors, in essence, without a plurality of windings of the magnetic core or the conductors.

In particular, it is advantageous that the core spatially crosses at right angles relative to the induction flux conductor of the triggering device.

The flux can also be conducted through a crosssing zone which forms a recess extending perpendicular to the portion of the core lying in proximity to the crossing zone and to that of the portion of the induction flux conductor lying in proximity to the crossing zone. The recess can be constructed polygonally or diamond-shaped.

In order to avoid that, at a direct current leakage current which quite rapidly increases to high values, a portion of the force lines which are thereby induced in the core will enter into the magnetic flux conductor with the actuator, the leakage current circuit breaker can be constructed as follows:

The induction flux conductor of the actuator contains a cutout in its arm intermediate the crossing zone and the bearing surface of the armature, whose imaginary axis stands essentially perpendicular on a plane which is constructed in the crossing zone by the arm and the core. About the remaining arm portions windings are positioned in the same direction and are interconnected at their ends. In such an electrical ring conductor, ingressing magnetic force lines induce a magnetic annular field which acts in opposition to the ingress.

A number of possibilities are available for the suppression of the residual magnetism in a magnetic system for assuring a constant-remaining operating point for the response of the triggering device.

In principle, the core can shaped tubularly and, between its transitions to the corssing zone, can be provided externally thereof with three apertures, one at each respective tube end and one centrally thereof. Intoduced, through these apertures are conductors in the form of an eight and connected to an alternating current generator.

The core can also be constructed solid and of magnetic and electrically-conductive material. One alternating current source has one pole connected hereby to the core on both sides thereof adjacent the crossing zone, and the other pole conducted to connecting location which is spaced relative to the crossing zone externally thereof preferably at the same distancing as to the other connecting locations.

It is also possible that the core may be constructed laminated from magnetic and electrically conductive material. Hereby, eddy current losses are reduced in a known manner. In order to reduce the residual magnetism, there can be additionally connected one pole from an alternating current to both sides of the core adjacent the crossing zone, and the other pole conducted to a connecting location which is spaced relative to the crossing zone externally of thereof preferably at the same distancing as to the other connecting locations.

The invention is now described in detail in the schematic accompanying drawings, and partly perspectively shown embodiments:

FIGS. 1 and 2 illustrate the suppression of a residual magnetism in a leakage current pursuant to FIG. 2 through an alternating current according to FIG. 1;

FIG. 3 represents the basic construction of a leakage current circuit breaker;

Figure 4:
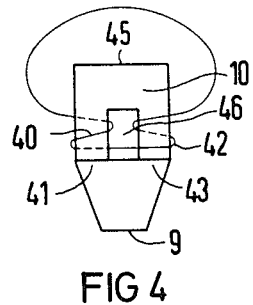
FIG. 4 illustrates a specially constructed arm of the induction flux conductor of the triggering device.

The leakage current circuit breaker according to FIG. 3 evidences the magnetic system 1 of a triggering device which can unlatch a switch lock cam 3 with the contacts 4 in the operating current-carrying conductors 5. Coupling elements of known type arranged between armature 8 and lock cam 3 are designated by reference numeral 2. The operating current-carrying conductors are individually designated with L1, L2, L3 and N.

The magnetic system 1 of the triggering device consists of a core 6 and an induction flux conductor 7 with the armature 8. The induction flux conductor 7 consists in detail of a crossing zone 9, an arm segment 10, the armature 8, and arm 11, an arm 12, and an arm segment 13. Arranged on the arm 12 is a permanent magnet 14.

The core 6 is interlinked with the operating current-carrying conductors 5, individually designated by L1, L2, L3 and N. In the embodiment according to FIG. 3, the core 6 forms an additional winding 15. The core 6 of magnetically-conductive material can be led in a plurality of windings about the operating current-carrying conductors 5 so as to raise the magnetic voltage or, in the simplest case in the construction according to FIG. 8, the operating current-carrying conductors 5 are, in total encompassed only one time annularly.

Core 6 and induction flux conductor 7 of the magnetic system 1, in this embodiment stand spaced mutually perpendicular on each other in the crossing zone 9. For a direct-current leakage current of suitable polarity, there is induced a magnetic flux in the core 6 which, in the crossing zone 9, stands perpendicular on the magnetic flux derived from the permanent magnet 14. From the permanent magnet 14 there emanates flux which passes through the arm 11 the armature 8, the arm segment 10, the crossing zone 9 and the arm segment 13 back to the arm 12. The component of the flux of the permanent magnet 14 which is conducted through the crossing zone 9 is more or less interrupted in dependence upon the intensity of the magnetic flux in the core 6 since the magnetic resistance increases due to the saturation commencing in the crossing zone 9.

When a leakage current flows which produces a sufficiently strong induction flux in the core 6, then the magnetic resistance in the crossing zone 9 increases to such an extent that the induction flux which is conducted from the permanent magnet 9 across the armature 8 is so weakened that the armature 9 will release and the lock cam 3 will open the contacts 4 of the leakage current circuit breaker and disconnect a consumer from the operating current-carrying conductors 5.

Figure 6:
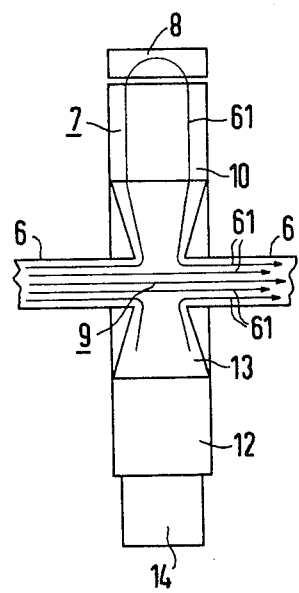
FIG. 6 is a front elevational view of the magnetic system of a leakage current circuit breaker shown with a broken off core.
Figure 7:
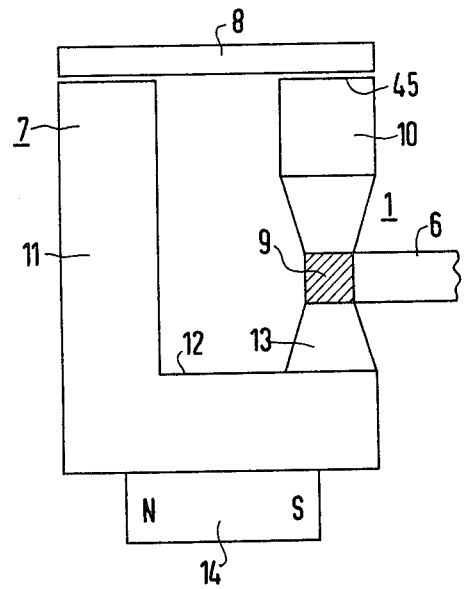
FIG. 7 shows a side elevational view of the magnetic system according to FIG. 6.

Illustrated in FIGS. 6 and 7 is the crossing zone 9 through two views which are offset 90° relative to each other. The reference numerals, in all instances, coincide with those in FIG. 3. In the event that a direct-current leakage current increases extremely rapidly from a zero value to an extremely high value, it can be possible that one portion of the force lines produced by this leakage current, in effect, lines of magnetic induction 61 according to FIG 6, will pass from core 6 through the induction flux conductor 7 to the armature 8. In order to assure the armature 8 nevertheless dropping down and to be able to actuate the leakage current circuit breaker, the arm segment 10 pursuant to FIG. 4 may be so constructed that a recess or clearance is formed between the crossing zone 9 and the bearing surface 45 of the armature. The imaginary axis of this recess is arranged essentially perpendicular on a plane which is produced from the arm 10 and the core 6 in the crossing zone 9. Positioned about both remaining arm segments 41 and 43 are the windings 40 and 42 and which are interconnected at their ends, as can be ascertained in detail from FIG. 4. A self-generating magnetic field which is directed in the one arm segment, for example 41, towards the armature, and in which in the other arm segment, for example 43, is directed towards the crossing zone 9, produces such a current in the coils 40, 42 which will act in opposition to an ingressing magnetic field.

Figure 5:
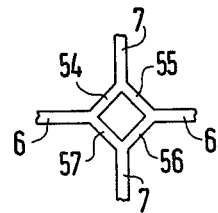
FIG. 5 illustrates a specially constructed crossing zone for the embodiment of a leakage current circuit breaker constructed in accordance with the principle of FIG. 3.

Crossing zone 9 of the magnetic system 1 of the triggering device is, in the embodiment according to FIG. 5, formed polygonally or diamond-shaped in the plane of the core 6 and the induction flux conductor 7. As a result, the magnetic flux in the crossing zone is conducted into the arm segments 54, 55, 57 and 56.

Figure 8:
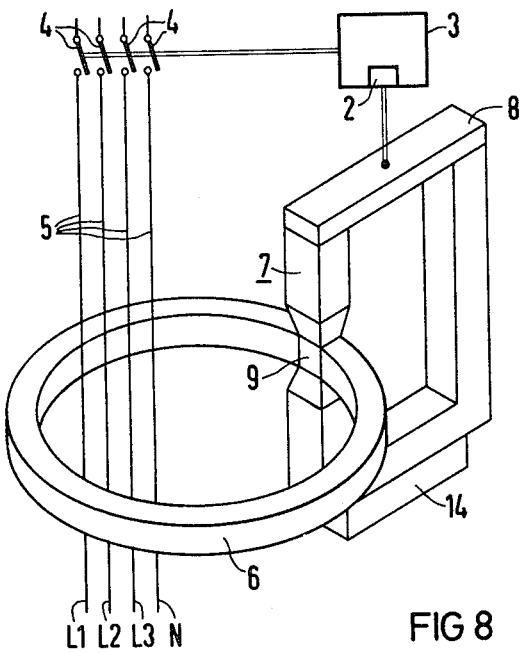
FIG. 8 illustrates a leakage current circuit breaker with a simplified constructed core.

In the embodiment according to FIG. 8, the core 6 is interlinked with the operating current-carrying conductors 5 by means of a single winding.

Figure 9:
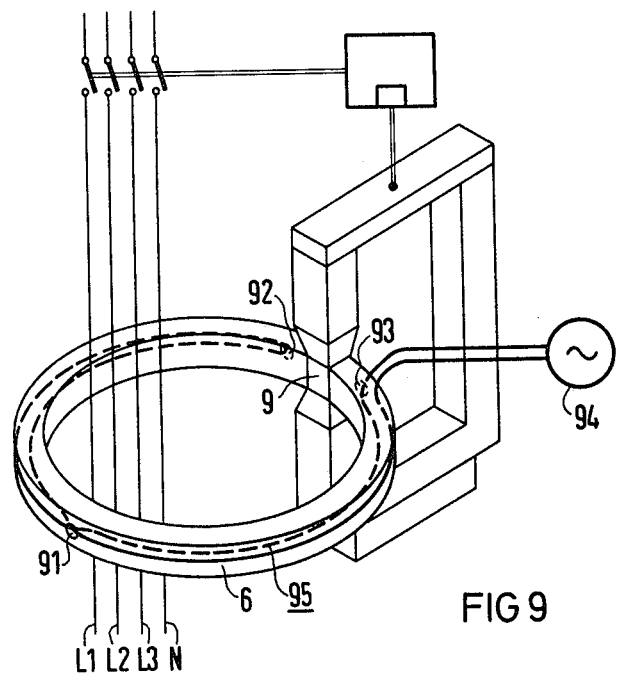
FIG. 9 illustrates a core pursuant to the construction of FIG. 8 with specialized measures for the suppression of the residual magnetism.

Described hereinbelow are measures for reducing the residual magnetism in the core 6:

In a leakage current circuit breaker pursuant to FIG. 9 whose construction essentially corresponds to that in FIG. 8, the core is, in principle, constructed tubularly, in the exemplary embodiment it evidences a box-like hollow profile. Between its transitions to the crossing zone 9, externally thereof are provided three apertures 91, 92 and 93. Respectively one aperture 92 and 93 is at each tube end and an aperture 91 is formed centrally thereof. Inserted through the apertures are conductors 95 in the form of an eight and connected to an alternating current generator 94.

One such arrangement is obtained in that, for example, from the generator 94 a conductor 95 leads from the tube end is inserted through the aperture 93, conducted out through the aperture 91, conducted externally along the armature wall, and at the other tube end again introduced through the aperture 92 into the tubularly-shaped core. The conductor is then again conducted out through the middle aperture 91 and conducted along the outer tube wall back up to about the tube end by the aperture 93 and connected with the other connection on the alternating current generator 94.

When an alternating current flows through the conductor 95 which is arranged in the form of an eight and there is designated for the entire tubular core 6 along its imaginary centerline a direction considered as being the positive, with the other as the negative, then there is determined that, at any given instance, in the interior of the tubular section the current direction is positive, and in the interior of the other tubular section it is negative. When both tube sections are equal in length then the electrical voltage which is induced in one tube section is opposite and equal to that which is induced in the other tube section. A disruptive current in the longitudinal direction of the tube will thus not be produced. Understandably, the conductor 95 is to be electrically insulated with respect to the wall of the tubular core 6. The annular-shaped magnetic field about the conductor 95 in the interior of the tubular core 6 reduces the residual magnetism in the core 6.

Figure 10:
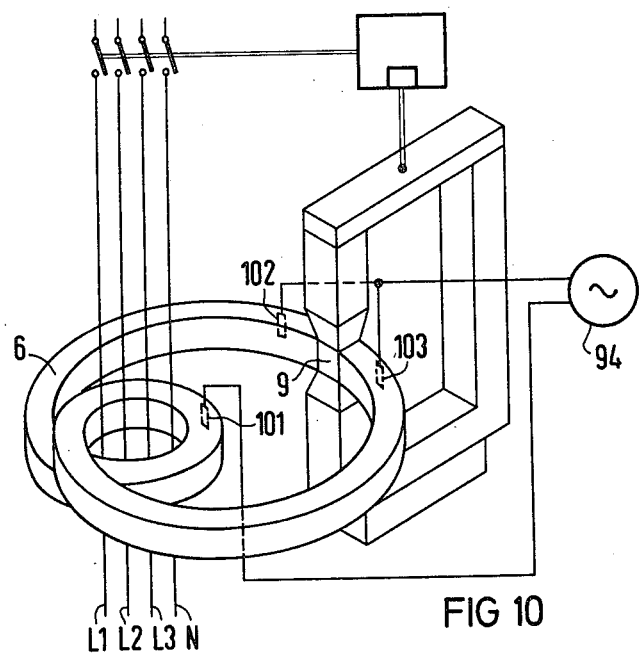
FIG. 10 illustrates a leakage current circuit breaker pursuant to the principle of construction of FIG. 3 whose core is, however, provided with measures for the suppression of the residual magnetism.

However, it is also possible to construct the core 6 according to FIG. 10 solidly from magnetic and electrically-conductive material, and to connect one pole from an alternating source 94 to both sides of core 6 at 102 and 103 adjacent the crossing zone 9. The other pole is led to a connectng location 101 which is spaced relative to the crossing zone 9 externally thereof at approximately the same distance as with the other connecting locations 102, 103. Thereby, current is conducted through the core 6 which, in dependence upon its frequency, more or less flows through the outer region. It is ideal when, at a predetermined time point, only a portion of the cross-section is magnetized perpendicular to the current direction, whereas the other portion thereof is magnetized only a little or not at all in this direction so that the magnetic induction flux, which is induced by the operating current-carrying conductors in the instance of leakage, is conducted into that portion of the cross-section which is only weakly magnetized perpendicular to the direction of the current and as a result possesses a high conductivity. For this purpose an optimum alternating current can be selected with respect to frequency and form.

The alternating current employed for suppression of the residual magnetism leaves behind a predetermined residual magnetism after its attenuation. This, however, cannot simulate any leakage current since its components in the longitudinal direction of the induction conductors are equal to zero.

In the event that the leakage current circuit breaker only surveilles a single-phase alternating current, the leakage current pursuant to FIG. 2 is normally displaced by only a small angle with respect to the operating current. As a result, the circuit can be so easily constructed that the residual magnetism-destroying current according to FIG. 1 will reach its peak value when the leakage current according to FIG. 2 traverses the value zero and, as can be ascertained from a combined view of FIGS. 1 and 2. At the time point wherein the leakage current passes through its maximum value, a high permeability of the core is particularly important so as to occasion a stronger induction flux across the crossing zone 9. Since the residual magnetism-destroying current pursuant to FIG. 1 then has a zero value, it does not effect any undesirable reduction in the permeability which could otherwise occur due to magnetic saturation transverse to the longitudinal direction of the core. For this described suppression of the residual magnetism, in accordance with known selection criteria, a suitable generator can be made available.

Figure 11:
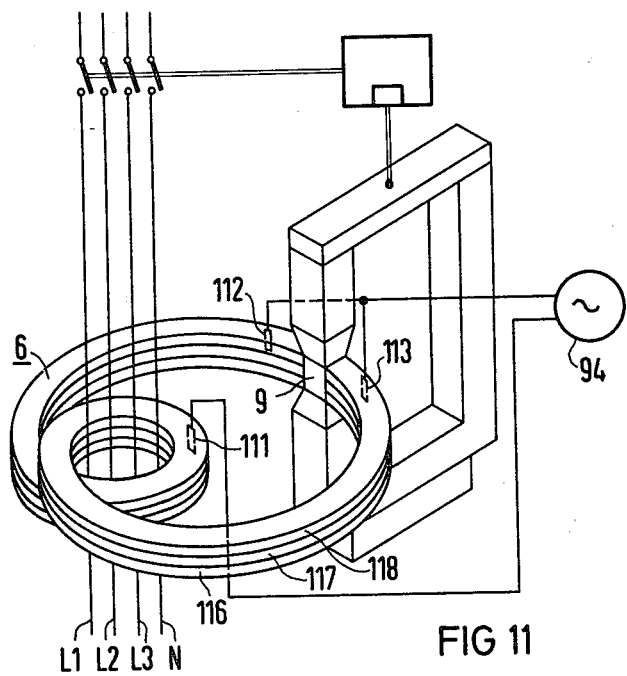
FIG. 11 illustrates a leakage current circuit breaker pursuant to a further embodiment and which is adapted for the suppression of the residual magnetism.

For the suppression of the eddy current losses, the core 6 pursuant to FIG. 11 can also be laminarly constructed of magnetic and electrically-conductive material, whereby the individual laminas are electrically insulated with respect to each other as is usual, for example, in transformer plates. An alternating current source 94, for the reduction of the residual magnetism, again has a pole connected to both sides of the core at 112 and 113 adjacent the crossing zone 9, and the other pole connected to a connecting location 111. This is positioned externally of the crossing zone 9 and at about the same spacing relative to the other connecting locations 112 and 113. The contact points at the connecting locations 112, 113 and 111 are so constructed as to electrically contact the laminar layers 116, 117 and 118.

A construction according to FIG. 11 operatively represents a magnetic system with a plurality of crossing zones, one crossing zone for each laminar layer 116, 117 respectively 118. In a construction pursuant to FIG. 3, of pursuant to FIG. 8, there can also be formed a second spatially remotely arranged crossing zone.

When the crossing zone is constructed according to FIG. 5, the lines of the magnetic induction flux to the armature, in essence in the induction flux conductor 7, and the lines of the induction flux originating from the leakage current, are parallel or lead together antiparallel, in that they genuinely cross in a crossing zone according to FIGS. 3, 6, 7, 8, 9, 10 and 11.

Since, as known, for particular specially treated iron-nickel alloys the permability considerably reduces when these are cold worked, it is advantageous to first produce the core 6 wherein it is subjected to a specialized annealing treatment subsequent to shaping in order to improve its properties which respect to permability. Thereafter, for the production of the magnetic system of the triggering device, the operating current conductors may, as needed, be conducted in a plurality of windings through the opening formed by the core.

What is claimed is:

1. Leakage current circuit breaker having operating current-carrying conductor interlinked with a core, whose magnetic induction flux effects the response of a triggering device in the case of leakage, in which an armature of the triggering device drops away from the magnetic system of the triggering device at the superposition of a permanent magnetic field by a magnetic field effected by the leakage current, and in which the core encompasses the operating current-carrying conductors in a plurality of windings, and wherein the core magnetizable by the leakage current is a component mechanically interconnected with the induction flux conductor of the triggering device, characterized in that the core (6) crosses the induction flux conductors (7) of the triggering device (2) in a single path passage through the core.

2. Leakage current circuit breaker as claimed in claim 1, characterized in that the core (6) spatially crosses the induction flux conductors (7) at right angles.

3. Leakage current circuit breaker as claimed in claim 1, characterized in that said circuit breaker has a crossing zone (9) which includes a recess extending perpendicular to the direction of the flux which is present in the core (6) and in the induction flux conductors (7) in proximity to the crossing zone whereby no operating current-carrying conductor is located in this recess.

4. Leakage current circuit breaker as claimed in claim 3, characterized in that the crossing zone (9) is polygonally shaped (FIG. 5) in the plane of the core (6) and the induction flux conductors (7).

5. Leakage current circuit breaker as claimed in claim 1, characterized in that the induction flux conductor (7) of the triggering device includes an arm (10) between the crossing zone (9) and the bearing surface (45) of the armature (8), a recess (46) being formed in the arm whose imaginary axis is substantially perpendicular on a plane defined by the arm (10) and the portion of the core (6) located proximate to the crossing zone, and windings (40,42) being wound about both remaining arm segments (41,43) in the same direction and being interconnected at their ends.

6. Leakage current circuit breaker as claimed in claim 1 or 5, characterized in that the core (6) is essentially tubularly-shaped and includes between its transitions to the crossing zone (9) three apertures (91,92,93) located exteriorly thereof, one aperture (92,93) at each tube end and one aperture (91) centrally formed through which there are inserted conductors (95) in the form of an eight and connected to an alternating current generator (94).

7. Leakage current circuit breaker as claimed in claim 1, characterized in that the core (6) is solidly formed of magnetic and electrically-conductive material, one pole of an alternating current source (94) being connected to both sides of the core (6) proximate the crossing zone (9) and the other pole being connected to a connecting location (101) which is spaced externally of the crossing zone (9) at preferably the same distance as to the other connecting locations (102,103).

8. Leakage current circuit breaker as claimed in claims 1 or 7, characterized in that said core (6) is constructed laminarly of magnetic and electrically-conductive material, one pole of an alternating current source (94) being connected to both sides of the core (6) proximate the crossing zone (9) and the other pole being connected to a connecting location (111) which is spaced externally of the crossing zone (9) at preferably the same distance as to the other connecting locations (112, 113) (FIG. 11).

* * * * *